Figure 1:
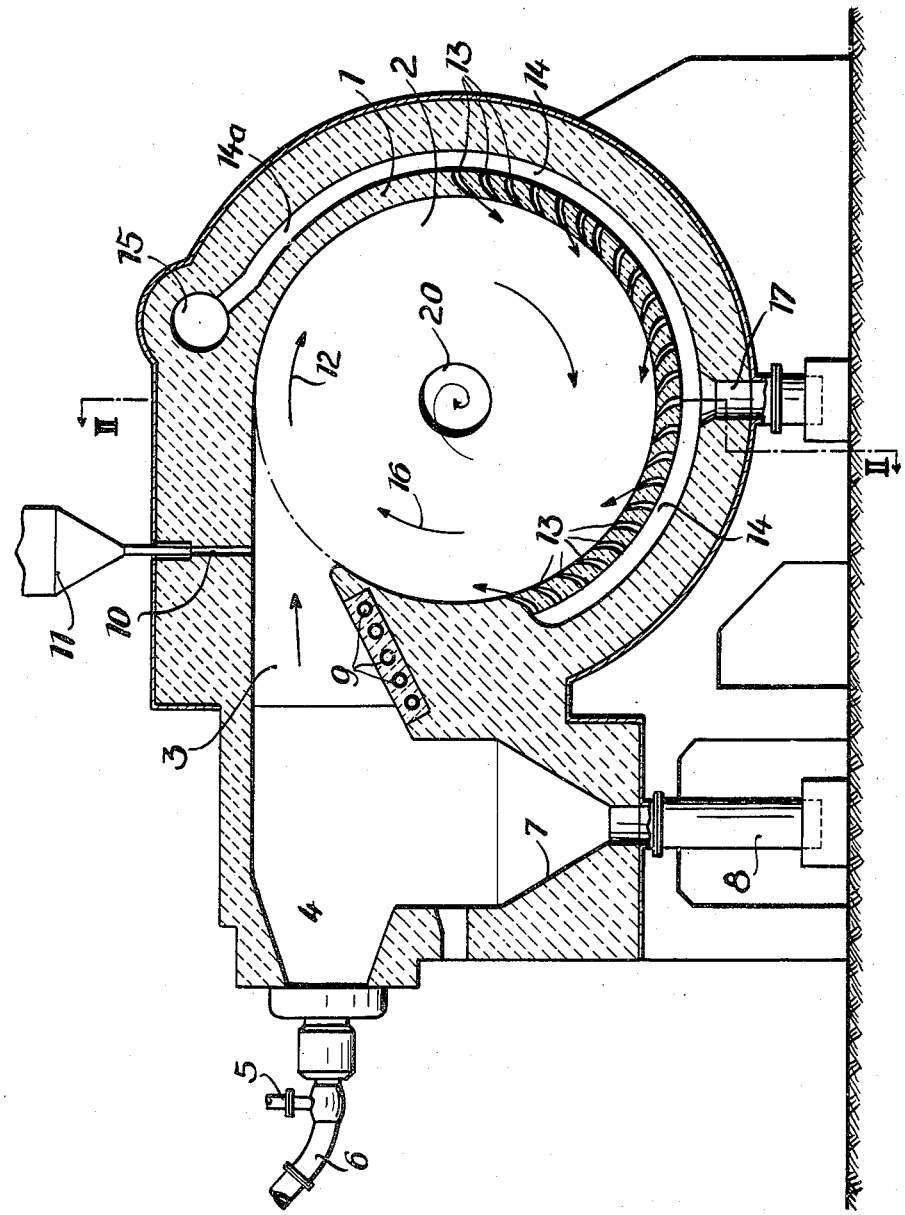

March 14, 1944. F. TOTZEK 2,344,007
APPARATUS FOR THE PRODUCTION OF EFFICIENT FUEL GASES
Filed April 5, 1940 2 Sheets-Sheet 1

Inventor:
Friedrich Totzek
By Henry Love Clark
atty.

March 14, 1944. F. TOTZEK 2,344,007
APPARATUS FOR THE PRODUCTION OF EFFICIENT FUEL GASES
Filed April 5, 1940 2 Sheets-Sheet 2

Patented Mar. 14, 1944

2,344,007

UNITED STATES PATENT OFFICE 2,344,007

APPARATUS FOR THE PRODUCTION OF EFFICIENT FUEL GASES

Friedrich Totzek, Essen, Germany, assignor, by mesne assignments, to Koppers Company, Pittsburgh, Pa., a corporation of Delaware Application April 5, 1940, Serial No. 327,951
In Germany April 18, 1939

7 Claims. (Cl. 48—63)

The invention relates to the production of a very efficient heating gas from dusty or finely granular fuels, as for instance, bituminous coal, or lignite coal, or coke thereof, a part of the fuel being burnt in a coal dust firing system, for the production of a gas rich in carbon di-oxide and the resulting hot combustion gases being brought into contact with the other part of the fuel. The carbon di-oxide contained in the hot combustion gases is more or less reduced to carbon monoxide by the carbon added, so that a combustible gas mixture results.

It has been proposed to combine the reduction of carbon di-oxide to carbon monoxide with the formation of water gas by adding steam to the hot combustion gases.

The invention has for its object to improve the heating value of the fuel gas produced in the above described process, and to utilize the fuel better, by separating the reaction of the carbon di-oxide containing gases with carbon from the reaction of steam with carbon. The reaction velocity between carbon di-oxide and carbon is comparatively low and is more increased at high temperatures than the velocity of the reaction between steam and carbon.

Now, the invention principally consists in intimately mixing first of all the hot combustion gases rich in carbon di-oxide of the coal dust firing with the other part of the fuel and then adding steam to the mixture.

As the hot combustion gases rich in carbon di-oxide are first of all mixed with the carbon at their highest temperature according to the invention, the reduction of carbon di-oxide to carbon monoxide takes place quicker, and to a greater extent, than with the processes for gasification of dusty fuel as known heretofore. The reaction between carbon and carbon di-oxide effects a quick dropping of the very high temperature at which the combustion gases leave the coal dust burner. Thereby the walls of the gasification and reaction chambers, respectively, are protected against superheating in a favorable manner. The part of the fuel not used for the reduction of the carbon di-oxide is gasified with steam with the formation of water gas.

According to the invention the addition of steam, preferably in superheated state, to the mixture of hot combustion gases and fuel is favorably carried out in such a way that the fuel is repeatedly treated with hot combustion gases by moving the remaining part of the fuel back into the zone of high temperature near the inlet of the hot combustion gases of the coal dust burner. By retreating the fuel with the hot combustion gases and steam a very good utilization of the carbon di-oxide contained in the fuel is arrived at.

The invention further comprehends an apparatus suitable for the carrying out of the new gasification process.

According to the invention the principal feature of the new gasifier is the provision of a reaction chamber having the form of a horizontal cylinder to the upper end of which the coal dust burner is connected, while steam inlet openings are provided in the cylindrical wall of the reaction chamber, opposite the mouth of the coal dust burner and at the bottom of the reaction chamber.

This principle of arrangement of the gasification chamber has the advantage that the residue resulting from the gasification of the fuel collects outside the zones of highest temperature which prevail near the mouth of the coal dust burner so that a smelting of the fuel ash is safely prevented. By the addition of steam the ash is granulated to a great extent, so that the formation of large slag lumps is avoided. Furthermore by the introduction of gasification steam, distributed over the whole cylindrical wall of the reaction chamber, there is achieved the end that the fuel particles have time enough to react with steam, or to be moved again in the zone of high temperature at the upper end of the reaction chamber by the flowing steam. The steam introduced along the walls of the reaction chamber also protects in a favorable manner the refractory lining of the reaction chamber against superheating.

In the preferred embodiment of the gas producer according to the present invention, the steam inlet openings are provided nearly tangentially to the direction of flow of the gasification media in the cylindrical chamber, whereby a strong rotation of the media is arrived at within the cylindrical reaction chamber, which is very favorable to the gasification.

Furthermore, the steam inlet openings may be arranged at a certain inclination to the longitudinal axis of the reaction room in the direction towards the ash outlet provided at the bottom of the reaction chamber, so that the ash may gradually be moved axially in the direction of the ash discharge. In this case it is favorable to arrange the gas outlet axially of the reaction chamber in one of the front walls of the reaction chamber, near the ash discharge.

Figure 2:
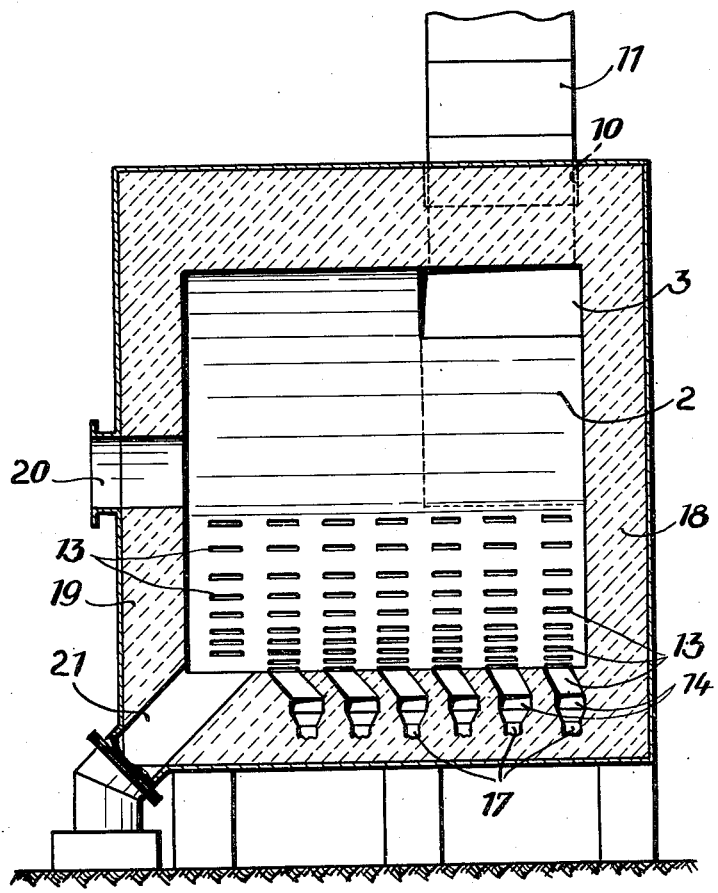

Further details of the gas producer plant constructed according to the present invention may be taken from the following description of a preferred embodiment of the invention on the lines of the accompanying drawings in which Fig. 1 is a vertical section taken longitudinally and Fig. 2 is a vertical cross section on line II—II of Fig. 1.

As shown on the drawings, the gas producer plant, according to the invention, has a reaction chamber 2 formed by the refractory brickwork 1, said reaction chamber having essentially the form of a horizontal cylinder. At the upper part of the reaction chamber 2 there is arranged nearly tangentially of the reaction chamber the mouth 3 of a normal coal dust burner 4. The fuel is introduced to the coal dust burner 4 through the pipe line 5 and the combustion air through the pipe line 6. Suitable means for the introduction of secondary air may further be provided for the coal dust burner. The ash resulting from the coal dust firing in burner 4 collects in the hopper 7 and may be drawn off through the pipe 8.

The hot combustion gases produced in the coal dust firing in burner 4 flow through the channel 3 with comparatively great velocity tangentially into the cylindrical reaction chamber 2. The walls of the channel 3 may, as shown at 9, be provided with cooling pipes through which the water serving for the production of steam may be passed in order to be preheated.

At the mouth of the connecting channel 3 in the reaction chamber 2 there is provided a slot 10 for the introduction of fuel. Said fuel is introduced to the slot from the storage tank 11.

The fuel falling from the slot 10 into the reaction chamber 2 is caught by the stream of hot combustion gases which enter through the mouth 3, the reaction chamber 2, and is moved in the direction of the arrow 12 through the reaction chamber 2. The hot combustion gases rich in carbon di-oxide of the coal dust burner 4 mix intimately with the fuel introduced at 10, whereby the carbon dioxide contained in the gases is reduced by reaction with the carbon to carbon monoxide.

The reacting media then flow along the wall of the reaction chamber 2 to a series of steam inlet openings 13 which are provided in the wall opposite the connecting channel 3 and at the bottom of the reaction chamber.

The steam inlet openings 13 extend from a common distributing channel 14, which extends parallel to the cylindrical wall of the reaction chamber 2. The channel 14 is connected with the steam inlet at 15. The portion of the steam distributing channel lying immediately opposite to the mouth 3 of the coal dust burner is designed— as indicated at 14a—as a preheating channel for steam. By preheating the steam the reaction of the steam with carbon is improved and a favorable cooling of the reaction chamber wall opposite the mouth of the coal dust burner is obtained.

As shown in the drawings, the steam inlet openings 13 are arranged approximately tangentially to the cylindrical wall of the reaction chamber 2, i. e., in the direction of flow of the gas stream prevailing in the reaction chamber. Thereby the fuel grains which are not immediately consumed in the reduction of carbon di-oxide and in the reaction with steam, are moved in clockwise direction through the reaction chamber 2. A more or less considerable part of the unconsumed fuel is further—as indicated by arrow 16—repeatedly brought before the mouth of the connecting channel 3, so as to be heated to a high temperature which completes the reaction.

The distributing channel 14 is provided at the bottom with an outlet opening 17, through which fuel particles which might have gotten into the distributing channel 14 through the steam opening 13 can be drawn off.

The reaction chamber 2 is closed at the ends by vertical front walls 18, 19. Preferably in the front wall 19 the off-take 20 for useful gas is provided, i. e., in the longitudinal axis of the reaction chamber 2. Near the front wall 19, in which the off-take 20 for useful gas is arranged, the discharge 21 for the ash is provided in the bottom of the reaction chamber 2.

As shown in Fig. 2 the steam inlet openings 13 extend not only tangentially to the cylindrical reaction chamber 2 but are also axially inclined in the direction of the ash discharge 21, said axial inclination of the steam inlet openings 13 increasing in degree from the reaction chamber front wall 18 opposite the ash discharge 21 towards the ash discharge. Thereby the ash collecting on the bottom of the reaction chamber 2 is gradually moved axially in direction towards the ash discharge 21, and this movement is facilitated by the uniform direction of flow of the resulting useful gases.

I have now above described my present invention on the lines of a preferred embodiment thereof, but my invention is not limited in all its aspects to the mode of carrying it out as described and shown, since the invention may be variously embodied within the scope of the following claims.

I claim:

1. Apparatus for producing fuel gas comprising: a substantially horizontal reaction chamber substantially circular in cross-section; a combustion chamber; passage-means leading from the combustion chamber into the upper part of the reaction chamber so constructed and arranged that the products of combustion are given a tangential and rotary movement in the reaction chamber; means for introducing finely divided solid fuel into the products of combustion adjacent the point of introduction of the products of combustion into the reaction chamber; and steam inlets to the reaction chamber in the wall of the reaction chamber opposite said point of introduction, said steam inlet being connected with a steam supply.

2. Apparatus for producing fuel gas comprising: a substantially horizontal reaction chamber substantially circular in cross-section; a combustion chamber; passage-means leading from the combustion chamber into the upper part of said reaction chamber so constructed and arranged that the products of combustion are given a tangential and rotary movement in the reaction chamber; means for introducing finely divided solid fuel from the top of the reaction chamber into the products of combustion adjacent the point of introduction of the products of combustion into the reaction chamber; steam inlets to the reaction chamber in the wall of the reaction chamber opposite said point of introduction, said steam inlet being connected with a steam supply; and further steam inlets in the bottom of the reaction chamber, said latter inlets being arranged substantially tangentially to the circumference of the reaction chamber.

3. Apparatus for producing fuel gas comprising: a substantially horizontal reaction chamber substantially circular in cross-section; a combustion chamber; passage-means leading from the combustion chamber into the upper part of said reaction chamber so constructed and arranged that the products of combustion are given a tangential and rotary movement in the reaction chamber; means for introducing finely divided solid fuel from the top of the reaction chamber into the products of combustion adjacent the point of introduction of the products of combustion into the reaction chamber; steam inlets to the reaction chamber in the wall of the reaction chamber opposite said points of introduction, said steam inlets being connected with a steam supply; and a gas outlet for the reaction chamber substantially axially of the same, in one axial end wall of the reaction chamber.

4. Apparatus as claimed in claim 1, wherein the steam inlets extend from a steam distributing channel arranged in a cylindrical circumferential wall of the reaction chamber.

5. Apparatus as claimed in claim 1, wherein the steam inlets extend from a steam distributing channel arranged in a cylindrical circumferential wall of the reaction chamber, and wherein the steam distributing channel extends through that part of the circumferential reaction chamber wall which lies just opposite to the passage means leading from the combustion chamber into the reaction chamber.

6. Apparatus as claimed in claim 1, wherein the reaction chamber is cylindrical, and the longitudinal axis of the steam inlets is inclined in the direction of the longitudinal axis of the cylindrical reaction chamber.

7. Apparatus as claimed in claim 3, wherein an ash discharge outlet is provided on the bottom of the reaction chamber near that axial end wall thereof in which the gas outlet for the reaction chamber is arranged.

FRIEDRICH TOTZEK.